United States Patent [19]
Flajole

[11] Patent Number: 5,319,857
[45] Date of Patent: Jun. 14, 1994

[54] CONSTRUCTION BOARD MITER GUIDE

[76] Inventor: Joseph P. Flajole, 1231 Flamingo Ave., El Cajon, Calif. 92021-3525

[21] Appl. No.: 6,624

[22] Filed: Jan. 21, 1993

[51] Int. Cl.⁵ .................. B23D 47/02; B27B 21/08
[52] U.S. Cl. ............................................. 30/376; 30/377
[58] Field of Search .................. 30/371, 372, 373, 374, 30/375, 376, 377, 378

[56] References Cited

U.S. PATENT DOCUMENTS

| | | | |
|---|---|---|---|
| 3,262,473 | 7/1966 | Elson | 30/377 |
| 3,586,075 | 6/1971 | Larsen | 30/376 |
| 3,977,080 | 8/1976 | Allaire | 30/376 |
| 4,202,233 | 5/1980 | Larson | 30/376 |
| 4,335,512 | 6/1982 | Sheps et al. | 30/376 |
| 4,483,071 | 11/1984 | Kolste | 30/376 |
| 4,624,054 | 11/1986 | Edwards | 30/376 |
| 5,121,554 | 6/1992 | Havins | 30/376 |

Primary Examiner—Richard K. Seidel
Assistant Examiner—Paul M. Heyrana, Sr.
Attorney, Agent, or Firm—Ralph S. Branscomb

[57] ABSTRACT

A simple miter guide uses planar sheet material to define an overlay panel, a saw guiderail and depending lumber guides and spacers which orient the lumber at a predetermined angle relative to the saw blade and space the guide over an underlying surface. The guide is designed specifically for construction lumber such as two-by-fours and two-by-sixes, and is used by placing the guide on a flat surface, and feeding the lumber into the guide from the back until it is properly aligned for the saw cut. The guide and lumber can be aligned to establish an orthogonal square-cut, or an angle-cut such as 45 degrees. A saw guiderail guides the end of the saw foot as it moves across the saw support raceway, spacing the sawblade adequately from the guide to prevent damage, and permitting an angled undercut to be made. Means to mount the guide to an underlying surface are provided, although unmounted operation is useful too.

8 Claims, 1 Drawing Sheet

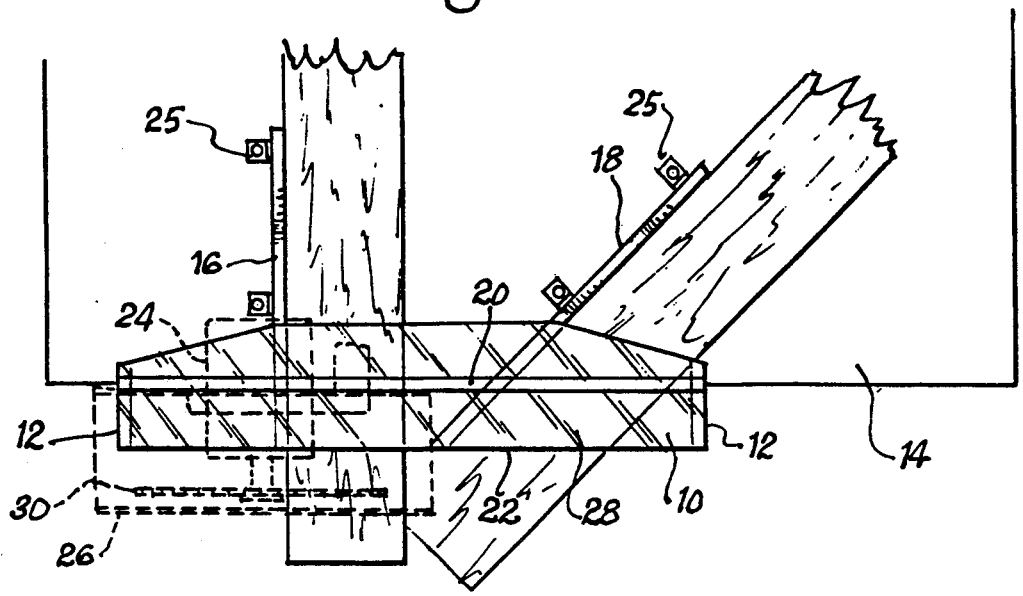
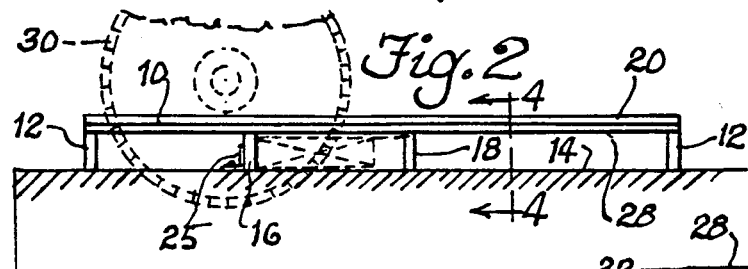
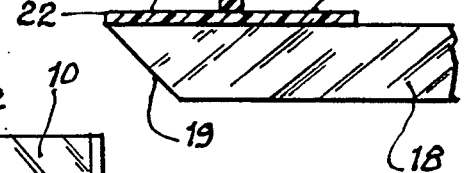
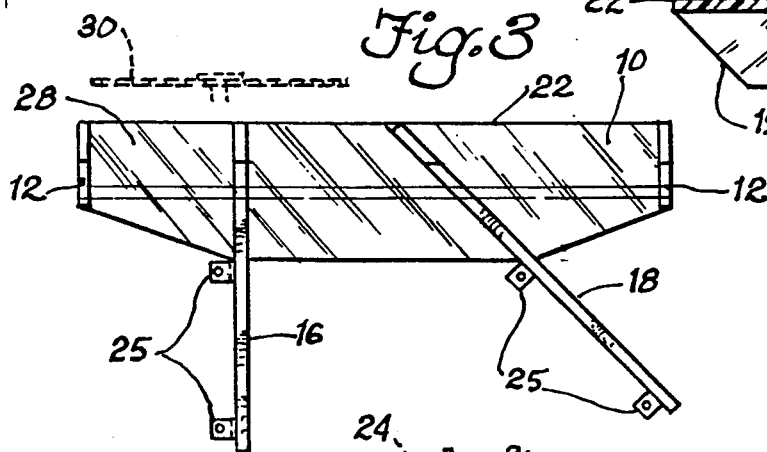
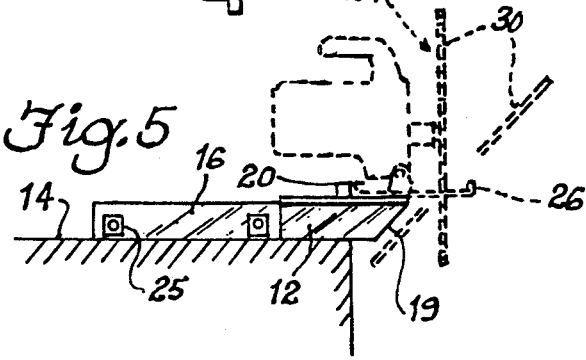

CONSTRUCTION BOARD MITER GUIDE

BACKGROUND OF THE INVENTION

The instant invention is the subject of Disclosure Document No. 320258, filed Nov. 9, 1992. It is in the field of miter boxes and other angle-establishing devices enabling quick and simple saw cuts to be made at predetermined angles with repeatable accuracy.

Many devices of this nature have been devised and patented over the years, as would be expected. These devices tend to be rather complicated by nature. Once having conceived a basic, simple idea, often the inventor or developer would expand upon the idea to accommodate many different functions or adjustments of the unit until the unit would become impractical either to use or to build.

Also, because of the infinite variety and the dimensioning and type of wood and other materials upon which a miter device may be used, an effort to accommodate all, or many, different types of wood or other materials results in a unit that is possible to use in many different ways but is not perfect for any single application.

For example, any miter device designed to use when cutting both plywood and two-by-fours would likely be awkward in either mode. Whereas, no doubt there are innumerable specialized angle-establishing devices for cutting materials, there is a need for a very simple miter guide which can be used on construction sites and which is particularly adapted to both the nature of construction work and the materials most often cut on construction sites. Specifically, because construction workers are continuously moving around in the building under construction, they carry power hand saws, particularly circular saws, as they move rather than bringing the wood to a central sawing area due to the mobile nature of their work and the fact that the wood that they cut is often in the form of long construction boards such as two-by-fours and two-by-sixes too long and awkward to be conveniently carried to a remote part of the building.

Many very fine angle-establishing aids are mountable on a stationary saw and not suitable for construction site use. Any miter guide used by construction workers must be lightweight, easy to use, and compact, as well as rugged and foolproof in operation.

SUMMARY OF THE INVENTION

The instant invention fulfills the above stated need by providing a miter guide which is specifically tailored to the cutting of one-by and two-by stock up to two-by-sixes. A guide for four inch stock could also be produced. On most construction sites, the majority of the lumber of this nature that is cut are either two-by-fours or two-by-sixes, although occasionally, two-by-tens, two-by-twelves or even larger two-by members, or four-by-fours or larger four-by members must be mitered.

By tailoring the miter guide very specifically to this particular range of wood products, it can be designed to specifically accord to the needs of on-the-job construction workers.

The invention comprises a flat overlay panel which defines a raceway edge parallel to the cutting plane in which the saw blade travels. Depending spacers are mounted to the overlay sheet to space it from an underlying surface a distance slightly greater than the 1½ inch thickness of two-by stock. Two lumber guides depend from the overlay panels to establish two sliding lumber paths respectively at 90 degrees, and at an angle, which is preferably 45 degrees.

The guide can be mounted to an underlying platform such as a portable plywood panel or a tabletop. If used in this mounted mode, clamps, a tape-measure length, or other conceivable accessories can be mounted to the guide.

The unit is extremely simple to use. The workman positions the miter guide on a flat underlying surface such as a tabletop, with the cutting plane of the saw overhanging the edge of the tabletop. The lumber member to be cut is then slid along the appropriate lumber guide across the tabletop surface until the pre-marked cut line on the lumber aligns with the saw's cutting plane. The handsaw is then slid along the saw raceway, making a repeatable accurate cut.

BRIEF DESCRIPTION OF THE DRAWINGS

FIG. 1 is a top plan view of the miter guide illustrating its use on the two-by-six in its alternative orthogonal and 45 degree cutting modes;

FIG. 2 is a front elevation view of the invention showing the lumber and rotary saw blade in phantom;

FIG. 3 is a bottom plan view of the invention illustrating the position of a saw blade relative to the miter guide;

FIG. 4 is a section taken along line 4—4 of FIG. 1 illustrating the 45 degree beveled front end of a lumber guide; and, FIG. 5 is a side elevation view somewhat diagrammatically illustrating use of the guide for cutting lumber at a non-orthogonal angle in the vertical plane, which permits the making of compound angle cuts when the lumber is positioned along the angle cut guide.

DETAILED DESCRIPTION OF THE PREFERRED EMBODIMENT

The invention is characterized by its simplicity by the absence of moving parts, and can be described quite simply. The idea is to make the unit as small and lightweight as possible, while at the same time ensuring that it is completely adequate to do the job. To accomplish this, the overlay panel 10 has a lengthwise extent relative to the dimensions of a two-by-six and the saw configuration to permit a typical power hand saw, which would ordinarily be a right-handed circular saw as shown in the drawings, to execute a full, clean stroke across the end of the lumber while it is in either the orthogonal or angle-cut mode, with the saw being fully supported on the guide raceway throughout the stroke. This relative dimensioning can be seen in FIG. 1. The saw blade should clear the raceway edge by one inch in most instances to allow for a 45 degree undercut.

The overlay panel preferable has spacers 12, which depend from the overlay panel like feet or legs to support the extremities of the panel on the underlying surface at its upstroke and downstroke ends. Although theoretically the spacers could be omitted, it would be difficult to follow through with a complete saw stroke unless the very ends of the panel are supported.

As can be seen from FIG. 2, the overlay panel 10 is spaced from the underlying surface 14 at a distance slightly greater than the true width of two-by stock. (This specification uses the terms "two-by" and "two-by-four" and "two-by-six" as they are standardly used in the industry, referring to the pre-milled inch dimensions of a cross section of the lumber in question, with "two-by stock" indicating any of this construction lumber that is two pre-milled inches, or 1½ actual inches, in thickness). A spacing of 1¾ inches, or ¼ more than the 1½ actual thickness of two-by stock is good. When cutting one-by's or other less than two-by stock plywood spacer inserts may be preferred beneath the lumber to be cut so that it is not spaced too far beneath the overlay panel.

Two lumber guides are defined, the square-cut guide 16 and the angle guide 18. Both of these guides are in the form of elongated slats, which could be either wood, plexiglass, aluminum or other suitable construction material. They each define sliding-lumber paths on their downstroke side, that is, the side of the respective guide remote from the starting point, as shown in FIG. 1 to accord with the safest cutting techniques. It is preferred that they both extend substantially beyond the rear surface of the overlay panel as shown in FIGS. 1 and 3 to permit the operator to grasp both the lumber guide and the lumber alongside it to hold the miter guide and the lumber together during the cut. Also of course, a longer guide in general results in a more accurate cut. The front ends of these guides, as well as the spacers, are undercut at forty-five degrees as shown at 19 to provide undercut saw clearance.

On top of the overlay panel is the guiderail 20. It is preferred that the entire unit be made of plexiglass, aluminum, hardwood or some other suitable construction material. The guiderail would either be made integrally with the overlay panel or bonded to the top as shown in FIG. 1. The guiderail is spaced from the raceway edge 22 of the overlay panel, and this edge together with the guiderail define the saw travel raceway 28.

Spacing of the guiderail from the edge 22 is such that when a circular saw such as indicated at 24 rests its guide foot 26 on the raceway 28, the saw blade 30 is spaced away from the saw edge 22 adequately to permit a clean cut without risking cutting up the saw edge 22 in the event the saw hits a knothole and angulates away from its parallel orientation shown in the figures. Additionally, as shown in FIG. 5, the blade must be far enough away from the saw edge of the overlay panel to permit it to make undercut angles in the lumber. The saw itself has an angle adjustment to do this and only requires adequate clearance of the miter guide. This expands the capability of the unit to permitting compound angle cuts with a single saw stroke. Compound cuts are commonly required for rafters and roof joists.

An alternative to the portable form of the invention just described is the mounted version in which the guide is fastened to an under lying surface such as a plywood panel or a table or bench top. Significant advantages arise from mounting the guide. The improved stability is a major help, and additionally clamps for clamping the lumber under the overlay panel can be added. A length of tape measure can be fastened to the platform extending perpendicularly away from the sawblade plane, and other accessories can be conceived of which are suitable for a fixed guide. Any suitable mounting means can be used, such as the L-shaped mounting brackets 25 by which the guide can be screwed or nailed to the underlying surface.

Although the invention can be made out of a number of different materials, for example something as simple as plywood and fir strips, preferably it is a synthetic such as a one-piece molded plastic, or sheet material cut and bonded together. This permits the guide, or at least the overlay panel, to be made transparent. Workmen like to be able to observe the action at the focal point of such activities as cutting to ensure that there is as little chance as possible of a deviation of the miter guide from the underlying board. Best visibility is achieved by producing the guide from transparent material.

The inventor has thus achieved the goal, which is to provide a simple, non-adjustable, lightweight product with no moving parts. This very basic, and fully foolproof unit surpasses the prior art, not in its adjustability and complexity, but in its particular adaptation to the job at hand by the maximization of its simplicity, portability, and lightweight.

It is hereby claimed:

1. A miter guide for use in assisting the cutting of two-by construction lumber using a power handsaw having a guide foot, said miter guide comprising:
   (a) a horizontal overlay panel defining a substantially linear raceway edge, said panel being elongated in the direction parallel to said edge;
   (b) a saw guiderail mounted atop said overlay panel and extending substantially parallel to said raceway edge and being spaced therefrom adequately to support a substantial portion of the foot of a power handsaw thereon, while permitting blade clearance of the sawblade of said handsaw with respect to the miter guide while said foot slides against said guiderail to accommodate an undercut angle of said sawblade of up to 45 degrees underneath said panel with the foot of said saw flush against said guiderail;
   (c) spacer means extending down from said overlay panel on the order of one-and-three-quarters inch to space same from an underlying surface to permit the sliding of a construction two-by stock thereunder with minimal clearance;
   (d) a square-cut lumber guide depending from said overlay panel and defining a sliding lumber path orthogonal to said saw guiderail;
   (e) an angle-cut lumber guide depending from said overlay panel and defining a sliding lumber path at a non-orthogonal angle with said guiderail;
   (f) said lumber guides each comprising an elongated slat mounted to the underside of said panel and extending rearwardly beyond said overlay panel and transversely of the longitudinal direction thereof adequately to enable a person using the guide to grasp a respective one of said guides and a length of lumber lying flushly there against and hold same together while making a cut; and,
   (f) said lumber guides, overlay panel, spacers and guiderails being substantially rigidly and integrally interconnected such that said miter guide has no moving parts and requires no adjustments or settings, permitting the user to use the miter guide over a two-by stock board, grip the board together with a selected one of said lumber guides, compress the selected lumber guide and said board together with one hand, and with a circular saw in the other hand, cut the board by sliding the saw against the raceway guiderail without making any adjustments or setups to the miter guide.

2. A guide according to claim 1 wherein said non-orthogonal angle is 45 degrees with respect to the guiderail.

3. A guide according to claim 1 wherein said spacers are positioned adjacent to the upstroke and downstroke ends of said raceway edge.

4. A guide according to claim 3 wherein said lumber guides extend substantially the same vertical length distance as said spacers to rest on an underlying surface with said spacers, and therefore act themselves as spacers.

5. A guide according to claim 1 wherein said lumber guides and said spacers are oriented on said overlay panel to permit the use of said miter guide on lumber up to at least six inches wide.

6. A guide according to claim 1 wherein said overlay panel is transparent to facilitate accurate positioning of lumber.

7. A guide according to claim 1 wherein said miter guide is substantially entirely fabricated from transparent synthetic sheet material.

8. A miter guide according to claim 1 wherein said lumber guides mount screw brackets rearwardly of said overlay panel for fastening same to an underlying surface.

* * * * *